June 17, 1958 — K. C. DEMETRIOU — 2,839,726
SYNCHRO ACCURACY COMPENSATION (TAPPED IMPEDANCES)
Filed Oct. 19, 1954 — 2 Sheets-Sheet 1
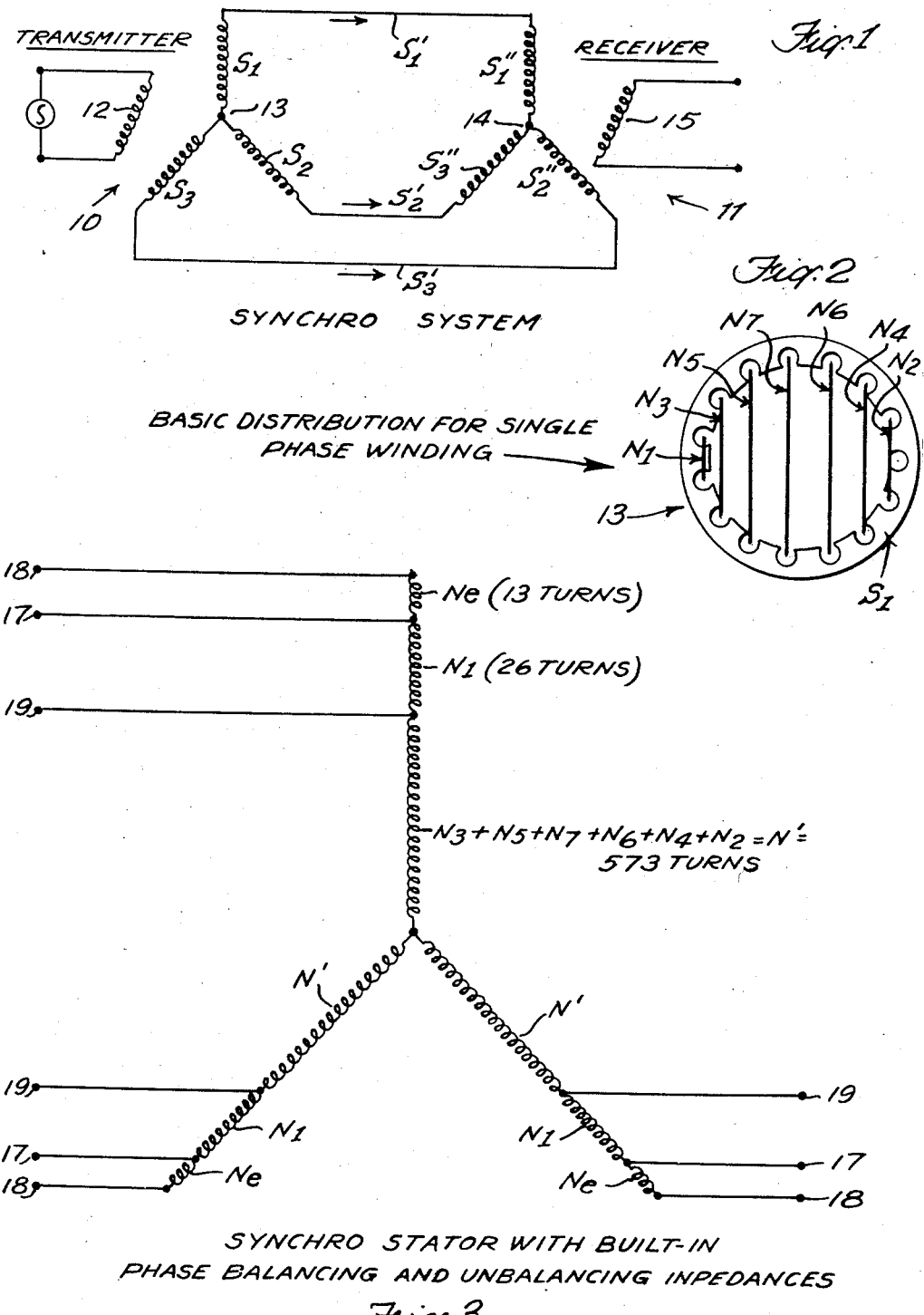

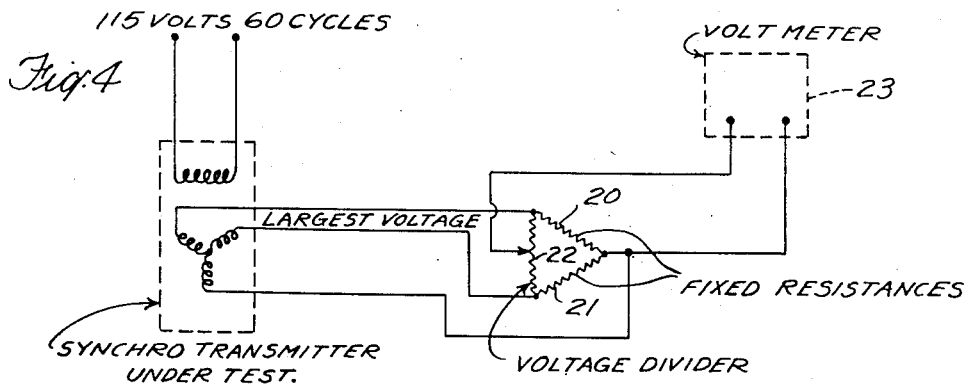
BASIC CIRCUIT EMPLOYED FOR STATIC ACCURACY TEST OF SYNCHRO TRANSMITTER.
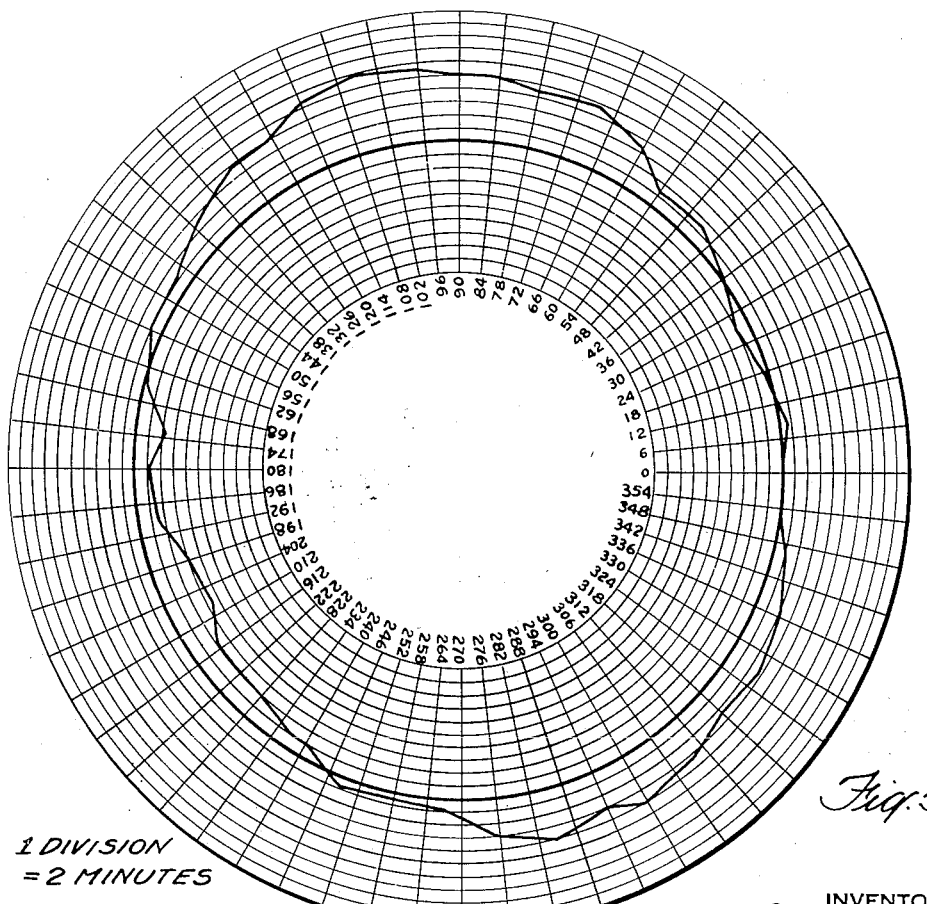
1 DIVISION = 2 MINUTES
STATIC ACCURACY WITH BASIC COMPLEMENT OF COILS

United States Patent Office 2,839,726
Patented June 17, 1958

2,839,726

SYNCHRO ACCURACY COMPENSATION (TAPPED IMPEDANCES)

Kimon C. Demetriou, Malibu, Calif., assignor to Sperry Rand Corporation, a corporation of Delaware Application October 19, 1954, Serial No. 463,270

2 Claims. (Cl. 324—158)

The present invention relates to an electrical precision instrument of the type having relatively rotatable inductively coupled elements, one of which carries a symmetrical, three-phase, Y-connected distributed winding. An example of such an instrument is the so-called "synchro" constituting either the transmitting component or receiving component of a self-synchronous system, these components being designed, electrically connected and set up to maintain continuously correspondence therebetween. The synchro transmitter, sometimes referred to as a "synchro generator," comprises a wound rotor mechanically driven and operating as a primary to impress inductively, upon a three-wire secondary circuit on a stator, three voltages, the values of which are dependent upon the angular position of the rotor. The synchro receiver is electrically similar to the synchro transmitter and its function is to rotate in response to the impressed order from the transmitter. To that end, the displacement of the rotor of the synchro receiver from a position of correspondence with the rotor of the synchro transmitter, creates a condition of electrical unbalance in the secondary circuit of said receiver, producing a torque tending to restore the receiver rotor to a position of correspondence.

In the following description, by "synchros" is intended to cover: (1) transmitter for transmitting electrical information corresponding to angular positions of the rotor; (2) a receiver torque in which an output torque is developed which is a function of the relative angular positions of the rotors in the generator or transmitter and the receiver; (3) a differential transmitter having a rotor mechanically driven to modify received electrical information and designed to transmit electrically the modified order; (4) a torque differential receiver in which an output torque is developed which is a function of the modified order transmitted by said differential transmitter; and (5) a control transformer having an output voltage which is a function of the relative angular position of the rotors in the generator or transmitter and in the control transformer.

Since the main function of synchros is to convert mechanical position into a corresponding electrical signal or vice versa, any deviation therefrom constitutes an error which adversely affects its utility. A synchro which is completely balanced mechanically and electrically and has an infinite number of slots in one of its elements, rotor or stator, will have no error. Since the number of slots in a synchro has to be finite, there is an error present which is a $6n$ periodic function, where $n$ is an integer. Of particular interest is the second harmonic in error curves. This second harmonic error is due to unbalance in the fundamental mutual impedances and therefore indirectly due to lack of manufacturing control, i. e., to mechanical eccentricities.

One object of the present invention is to provide a new and improved method and means of controlling and suppressing second harmonic errors in an electrical device of the type described, caused by electrical unbalances in mutual impedances, without the use of external loading or trimming expedients (i. e. capacitors or resistors).

In accordance with the present invention, taps are provided in the windings of each individual phase of a three-phase winding system of a synchro and these are utilized selectively to adjust the number of turns in the windings of the individual phases and thereby to impose an unbalance in the mutual impedance of one phase winding in relation to another phase winding. The adjustment described is made sufficient to counteract the effect of unbalance in the mutual impedances due to manufacturing inconsistencies and to reduce thereby the magnitude of the second harmonic errors. The synchro in basic form before adjustment has its coils arranged as a symmetrical, three-phase, Y-connected winding, the axes of the different phases being displaced 120° apart in space, and the coils and the number of turns in the coils being the same in the different phases. Through tap connections in the end coil of each phase, turns may be added or subtracted to the basic winding of any one phase until the required reduction in the second harmonic error is attained.

Various other objects, features and advantages of the present invention are apparent from the following particular description, and from the accompanying drawings, in which:

Fig. 1 is a diagram of the basic circuit of a synchro system having components to which the present invention may be applied;

Fig. 2 is a diagram of the stator of a synchro having a basic complement of coils, only one phase being shown, this synchro being adaptable for the application thereto of the principles of the present invention;

Fig. 3 is a diagram of the windings of a synchro stator with built-in phase balancing and unbalancing impedances and tap connections therefor, in accordance with the present invention;

Fig. 4 is the basic circuit which can be employed for the static accuracy test of the synchro in determining the manner of phase unbalancing adjustment; and Fig. 5 is a static accuracy chart of the synchro made initially with its basic complement of coils but without any unbalancing adjustment and showing the second harmonic error to be suppressed in accordance with the present invention.

Referring to Fig. 1 of the drawings, there is shown a synchro system containing components to which the present invention is applicable. This system consists of a synchro transmitter or generator 10 and a synchro receiver 11 electrically connected together. The synchro transmitter 10 comprises a rotor 12 and a stator 13 inductively coupled and rotatable with respect to each other. The rotor 12 carries the primary and is provided with a single phase winding having two emerging leads connected to a supply circuit which is a normal single phase alternating current source. The stator 13 carries the secondary consisting of a symmetrical, three-phase, concentric, Y-connected winding, the different winding phases $S_1$, $S_2$ and $S_3$ being 120° apart in space. Three wires $S'_1$, $S'_2$ and $S'_3$, from the three windings $S_1$, $S_2$ and $S_3$, are connected to the windings $S''_1$, $S''_2$ and $S''_3$, of the stator of the synchro receiver 11. This synchro receiver 11 is similar to the synchro transmitter 10, in that it comprises a rotor 15 and a stator 14 inductively coupled, the stator being provided with a symmetrical, three-phase, concentric, Y-connected secondary consisting of windings $S''_1$, $S''_2$ and $S''_3$, and the rotor with a single-phase primary winding. Orders transmitted electrically along the three wires S'₁, S'₂ and S'₃ in accordance with the rotative position of the transmitter rotor 12 cause the receiver rotor 15 to rotate in correspondence to said orders.

The invention is illustrated herein in connection with the synchro transmitter 10 of a generator torque receiver system only for purposes of illustration, but it must be understood that the invention is also useful in connection with a generator-control transformer system, in which an output voltage is produced which is a function of the relative angular positions of the rotors in the generator and in the control transformer of the system.

In accordance with the present invention, it has been determined that the relationship between the second harmonic error and the mutual impedances of the different phases in a synchro transmiter is as follows:

$Er$ equals approximately $\frac{m1-(m2-m3)}{6m1} \sin 2\phi$ where $Er$ is the error of the synchro, $m1$, $m2$ and $m3$ represent the mutual impedances of phases 1, 2 and 3 respectively of the stator windings of the transmitter, and $\phi$ is the angle of the rotor relative to a reference (i. e. electrical zero). Therefore, the accuracy of the synchro with regard to second harmonic error, is a function of the mutual impedance of the stator windings. If the synchro is unbalanced in its fundamental mutual impedance, there appears in the error a second harmonic. Such second harmonic errors appear in a three-phase winding, even though such a winding contains a full complement of coils and the number of coils and turns in the different phases are exactly the same.

In a concentric type of 3-phase, Y-connected winding, the fundamental mutual impedance of any phase is proportional to the number of turns in the winding of said phase. If the stator is wound so that the number of turns per phase is not the same for all the phases, an unbalance is imposed upon the mutual impedance which can be made sufficient to counteract the prevailing unbalance and which therefore can be made to suppress second harmonic errors. Since the exact nature of these unbalances cannot be predicted or determined until after the synchro is constructed, it is contemplated, in accordance with the present invention, that the synchro be built in the first instant in basic form with a complement of coils in which each phase has the same number of coils and the turns in the coils are the same for the different phases. This basic synchro, however, has tapped connections to permit the adjusting addition or subtraction of built-in turns to or from any one phase winding, the extent of any such adjustment and the selection of any particular phase winding to be adjusted being determined by subjecting the synchro to a static accuracy test, in a manner to be described.

There is shown for the purpose of illustration in Fig. 2, the stator of a specific "synchro" transmitter to which the present invention can be applied. Only the basic windings S₁ of a single one of its three phases is shown, the other basic phase windings S₂, S₃ being the same, except that they are arranged in space 120° and 240° respectively from the phase S₁ shown. The stator windings are constructed and designed in basic form with a full complement of coils desirably in the manner indicated in the AIEE publication by W. R. Appleman in the November 1937 issue, pages 1359-1367, in an article entitled "The cause and elimination of noise in small motors." In accordance with that scheme, after the total number of turns in each phase and the number of slots has been determined, the number of turns in each coil is calculated by the application of the formula $$A = \frac{\sin (\frac{1}{2} \text{ angle enclosed by coil})}{\Sigma \sin (\frac{1}{2} \text{ angles enclosed by all the coils})}$$

where $A$ is the proportion of the total number of turns to be allotted to a specific coil. Applying this formulation to the 15-slot stator shown in Fig. 2 having 599 total turns for each phase winding distributed among a full complement of seven coils N1, N2, N3, N4, N5, N6 and N7, the distribution will be as follows:

N1= 26 turns
N2= 51 turns
N3= 74 turns
N4= 94 turns
N5=109 turns
N6=120 turns
N7=125 turns 599 turns/phase In accordance with one aspect of the present invention, the desired unbalance in the number of turns of one phase winding with respect to the other phase windings may be attained by adding an impedance $Ne$, consisting of a small number of turns desirably less than the number of turns in the smallest basic coil N1. In the specific form illustrated, an unbalancing impedance $Ne$ of 13 turns is added to the 26 basic turns of the smallest end coil N1 in the same slots receiving said coil, and this unbalancing impedance is tapped in so that it may be either added in or removed from the corresponding phase circuit according to the showing of a static accuracy test. Fig. 3 shows the adjusting impedance $Ne$ tapped into the basic winding of each of the phases by tap connections 17 and 18. By attaching the conductor to the tap 17, the adjusting impedance $Ne$ is removed from the phase circuit and by attaching the conductor to the tap 18, the adjusting impedance is added to the phase circuit. The synchro is subjected to a static accuracy test, to determine in which phase winding the unbalancing impedance is to be added to reduce the magnitude of the second harmonic error, while maintaining the normal accuracy of the unit under consideration.

Fig. 4 shows the circuit which may be employed to carry out the static accuracy tests to determine into which of the phases the adjusting impedance is to be tapped to obtain optimum performance. A static accuracy test of suitable type is performed by means of a so-called delta tester applying the voltage divider method. This method consists in comparing the actual position of the synchro rotor with the electrical position of the synchro. The electrical position of the synchro is obtained from the following equation:

Electrical position $= \phi + (N+3M)$ 60° where $$\phi = \cot^{-1} \frac{1-2R}{\sqrt{3}} - 60°$$

$R =$ ratio of $$\frac{\text{one of the smaller secondary voltages}}{\text{largest secondary voltage}}$$

$M=0$ when voltage E (S₁₃) is in phase with the voltage across the terminals of the primary $M=1$ when voltage E (S₁₃) is 180° out of phase with the voltage across the terminals of the primary and $N$ is determined from the following tables:

| Terminals giving largest secondary voltage | Terminals giving small secondary voltage | Value of N |
|---|---|---|
| S₂—S₁ | S₁—S₃ | 0 |
| S₁—S₃ | S₃—S₂ | 1 |
| S₃—S₂ | S₂—S₁ | 2 |

The circuit employed for the static accuracy testing of the cynchro transmitter shown in Fig. 3 is illustrated in Fig. 4 and is energized from a normal single phase alternating current source. Two non-inductive resistors 20 and 21 and non-inductive decade voltage divider 22 are connected in delta across the output circuits $S_1$, $S_2$ and $S_3$. The voltage divider 22 is connected across the secondary terminals given the largest voltage and the resistors 20 and 21 are connected across the terminals given the smaller voltages. The variable tap on the voltage divider is connected to a common electronic nullmeter 23. The voltage divider is set at the proper ratio (R in the formula) for the desired electrical position and the synchro shaft of the rotor is turned until a minimum reading of the electronic nullmeter 23 for the fundamental in phase component of error voltage is observed. The position of the rotor is then recorded. The error is defined as the rotor position minus the electrical position.

In the method of the present invention, the basic synchro to be adjusted is first tested with its basic complements of coils and with no adjusting impedance N$e$ tapped into the phase circuits. Fig. 5 shows a typical static accuracy chart of a basic non-adjusted synchro of the type shown in Fig. 2 made by this initial test. The two diametrically opposite major lobes of the curve indicate a second harmonic error in the synchro, even though the basic coils in the different phases are exactly the same and the radial distances from the circular datum line A to the curves indicate the degree of error in minutes. This second harmonic error is due to manufacturing inconsistencies as described previously. The impedance N$e$ in one of the phase windings is then added into said winding, the synchro so provisionally adjusted is subjected to a static accuracy test and the results are charted. This impedance N$e$ is then disconnected, the impedance N$e$ in the next phase winding is added to said winding and a static accuracy test run to obtain an error curve. A similar test is run with the impedance N$e$ added to the last phase winding and the other two impedances removed from the other two phase windings. By comparing the different static accuracy charts obtained as described, that impedance N$e$ is added permanently, to its corresponding phase winding which gives the least second harmonic error in the required sector of the chart.

There may be certain types and models of synchros, which may respond more effectively to the removal of turns from its basic complement of coils in imposing an adjusting unbalance in mutual impedance to counteract the unbalancing effect of manufacturing inaccuracies. Fig. 3 therefore shows each basic phase winding tapped not only with connections 17 and 18 by which an impedance N$e$ may be added to the basic winding but also with taps 19 by which the smallest coil N1 from any one phase winding may be cut out of the phase winding to create the necessary unbalance in mutual impedance between the different phase windings. The synchro can be tested in the manner described to determine the phase winding from which the coil N1 can be removed to suppress second harmonic errors.

Instead of tapping the entire coil N1 for total inclusion in or exclusion from the corresponding phase winding, only part of this coil need be tapped for certain types and models of cynchros so that only a small unbalance in the number of turns in one phase winding with respect to the other phase windings is imposed.

In accordance with the present invention, it is desirable that the synchro have a full complement of basic coils before adjustment and that adjustment be effected by the addition or subtraction of turns to the basic coils of any one phase. By a "full complement" of basic coils is intended a complement of coils designed according to the formulation described in the AIEE publication above.

Although it is preferable to have a full complement of basic coils to start with, as far as certain aspects of the invention are concerned, the synchro may have a less number of basic coils, as long as the basic coils in all the phases are the same, are similarly distributed and contain the same number of turns. Also, the invention as far as certain aspects of the invention are concerned, may be applied to synchros in which the small coils in the basic unit are eliminated for the sake of simplicity. However, this will require the tapping of larger coils for removal from the circuit for the purpose of adjustment. The elimination of such a larger coil from any one phase may cause such unbalance as to create harmonic errors of higher order than the second. Under certain conditions, the appearance of these harmonic errors of higher order may not be of sufficient amplitude to justify the use of a full complement of basic coils in the synchro before adjustment.

Where the nature of the discrepency is totally unknown, the synchro may be built with tap connections 17, 18 and 19 as shown in Fig. 3, and the synchro tested to determine whether the smallest coil N1 or part thereof is to be subtracted from the basic winding of any one phase or whether the turns N$e$ are to be tapped and added into the basic winding of any one phase. Synchros of certain type, size and model may have a common mechanical unbalance which will respond more effectively to adjustment of a certain character. In that case, where this character has been determined, the basic synchro need be provided in one type only with one set of built-in tap connections 17 and 18 in each phase and built-in unbalancing turns N$e$ to permit the addition of turns N$e$ to the basic winding of any one phase, or provided in another type only with the built-in tap connections 17 and 19 to remove any balancing coil N1 or part thereof from the basic winding of any one phase.

Once the synchro has been tested and the proper adjustment has been determined, this adjustment is made permanent and the synchro used in the field in adjusted condition.

While the invention has been described with particular reference to specific embodiments, it is to be understood that it is not to be limited thereto but is to be construed broadly and restricted solely by the scope of the appended claims.

What is claimed is:

1. A method of reducing a second harmonic error in an electrical instrument of the type having relatively rotatable inductively coupled elements, one of which carries basic, symmetrical, three-phase, Y-connected, distributed windings with the coils in the different phases equally distributed and having the same number of turns, which method comprises providing each of the basic phase windings with tap connections by which the number of turns in any one phase winding can be unbalanced in relation to the number of turns in the other phase windings, and manipulating the tap connections of the windings of the three phases in sequence while charting the static accuracy of the instrument, to determine which phase winding when unbalanced in relation to the other phase windings will reduce the second harmonic error to a minimum.

2. A method of reducing a second harmonic error in a synchro transmitter having a rotor wound in single phase serving as a primary and a stator with an odd number of slots and carrying a secondary comprising a symmetrical, three-phase, Y-connected, concentric windings with a full complement of coils equally distributed in the different phases and having the same number of turns in the different phases, which method comprises altering in sequence the number of turns in the smallest end coil in each of the basic phase windings in relation to the number of turns in the smallest end coils in the other basic phase windings, while testing the synchro transmitter for static accuracy and charting the results of the tests, to determine which phase winding when unbalanced in relation to the other phase windings will reduce the second harmonic error to a minimum.

References Cited in the file of this patent

UNITED STATES PATENTS

| | | |
|---|---|---|
| 2,606,944 | MacCallum | Aug. 12, 1952 |
| 2,625,599 | Downes | Jan 13, 1953 |